United States Patent [19]

McIntyre et al.

[11] Patent Number: 4,924,419

[45] Date of Patent: May 8, 1990

[54] SYSTEM AND A METHOD FOR DETECTING A MALFUNCTION IN THE OPERATION OF A PARTS ASSEMBLY MACHINE

[75] Inventors: Dennis A. McIntyre, Rochester; Edward J. Sullivan, Canandaigua, both of N.Y.

[73] Assignee: Eastman Kodak Company, Rochester, N.Y.

[21] Appl. No.: 197,861

[22] Filed: May 24, 1988

[51] Int. Cl.$^5$ .................... G06F 15/46; G05B 9/02
[52] U.S. Cl. .................... 364/551.02; 29/710; 29/806
[58] Field of Search ............ 29/509, 525, 710, 773, 29/806; 53/67; 364/550, 184, 551.01, 551.02

[56] References Cited

U.S. PATENT DOCUMENTS

| 3,136,042 | 6/1964 | Horn et al. | 29/710 |
| 3,802,051 | 4/1974 | Andler et al. | 29/710 |
| 3,802,052 | 4/1974 | Andler | 29/710 |
| 4,115,913 | 9/1978 | Moriya et al. | 29/773 |
| 4,656,737 | 4/1987 | Shimizu et al. | 29/806 |
| 4,704,693 | 11/1987 | Thomas | 364/551.01 |
| 4,706,187 | 11/1987 | Arai et al. | 29/710 |

FOREIGN PATENT DOCUMENTS 0227907 10/1985 German Democratic Rep. ... 29/710

Primary Examiner—Kevin J. Teska
Attorney, Agent, or Firm—Edward Dugas

[57] ABSTRACT

The system and method of the present invention senses the time that it takes an automatic machine to assemble two or more parts and compares that time against a know time for correctly assembled parts. If the sensed time varies from the known time the attempted part assembly is rejected. A linear signal transducer is coupled to an assembler portion of the automatic machine to provide a signal indicative of the time it takes for the assembler portion to traverse its assembly distance. The provided signal is compared against a predetermined threshold signal for purposes of determining a variance corresponding to a defect in the assembly process.

7 Claims, 4 Drawing Sheets

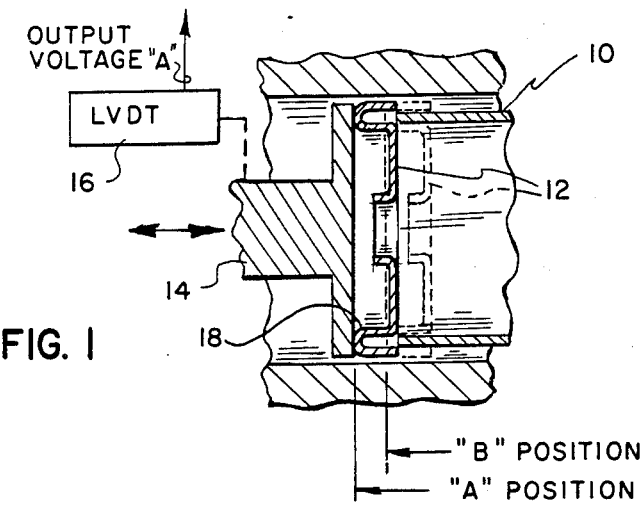
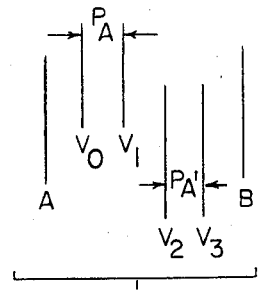
FIG. 1
FIG. 1a
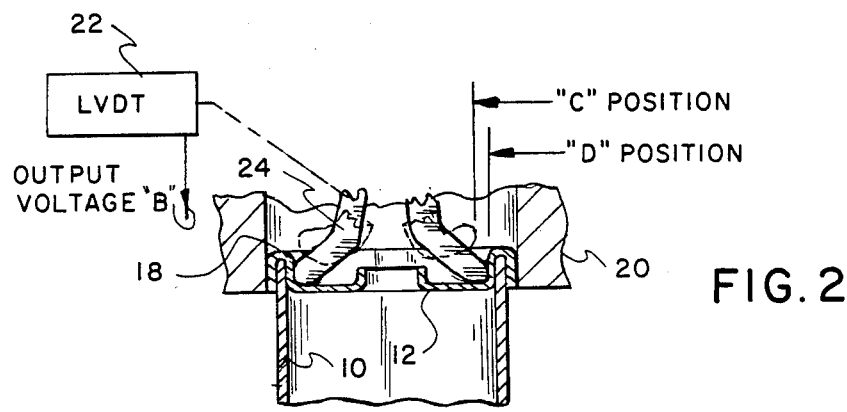
FIG. 2
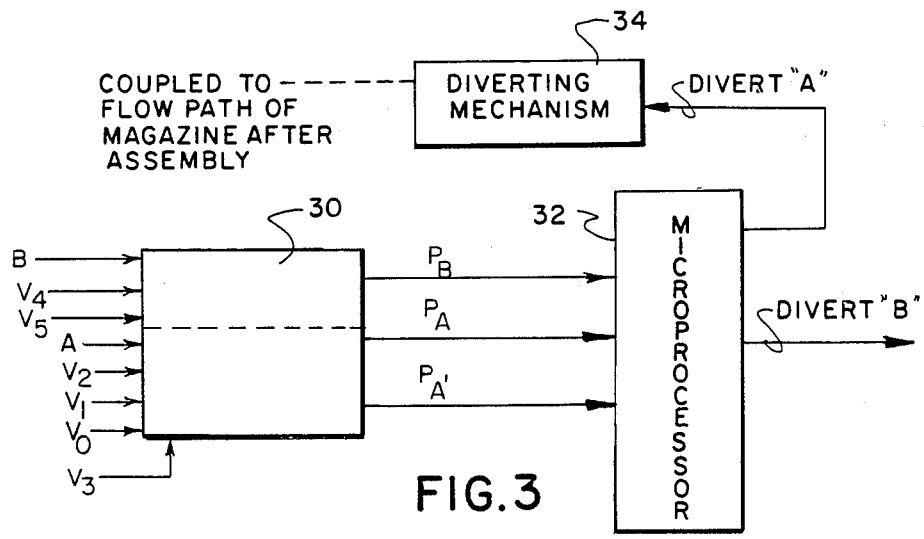
FIG. 3

SYSTEM AND A METHOD FOR DETECTING A MALFUNCTION IN THE OPERATION OF A PARTS ASSEMBLY MACHINE

BACKGROUND OF THE INVENTION

This invention relates generally to detectors, and more specifically to a system and a method for detecting a malfunction in a magazine spooling machine of the type that assembles end caps to a film magazine.

It is well known in the photographic industry to provide cylindrical film cans or magazines having a first light-tight cap at one end and a light-tight mouth formed by axially extending, peripheral spaced-apart lips onto which plush material is secured in a facing relation. In the manufacture of such film magazines under darkroom conditions, a spool having a roll of unexposed light-sensitive film wound thereon is fed into the outer free end of each magazine with a leading end portion thereof extending through the light-tight mouth of the magazine. The magazine containing the film is positioned in a forming or capping jaw which compresses the outer free end of the magazine to the precise shape for receiving a second end cap. The second end cap is fed from an end cap source to a position in alignment with the magazine, and the second end cap is advanced by a staking mechanism onto or over the free end of the magazine. A portion of the staking mechanism is expanded, crimping the rim of the second end cap to the end of the magazine to form a completed light-tight film magazine. Problems have arisen in situations in which the first or the second end cap is, missing from the magazine, reversed in the feed to the assembly area, improperly staked, which results in a defective film magazine.

A patent of interest for its teaching of a mechanism for detecting a missing end cap is U.S. Pat. No. 3,802,052 entitled "Detecting Mechanisms for Detecting a Missing End Cap of a Film" by R. C. Andler et al, which patent is assigned to Eastman Kodak Company, the assignee of the present application.

The detector of that patent utilizes a pusher element which moves a predetermined distance into engagement with one end of the magazine. If the cap is correctly positioned the pusher is stopped; if the cap is missing or improperly set the magazine is ejected.

In some instances, an improperly set cap may pass undetected because physically it is in a position that is considered to be correct.

The system and the method of the present invention senses the time it takes to position the end cap on the magazine. An interference will increase the time and a missing end cap will decrease the time. The staking process is also monitored using a similar system and method, which checks and final home and extended positions of staking fingers.

Error conditions that can be sensed by the present system and method include backward caps, bent caps, bent magazines, no cap, spools staked under, misaligned parts, oversized caps, and faulty machine hydraulics. Also, the present system and method can indicate trends which are related to part wear. For example, if times for assembly start to increase gradually over a large number of parts it tends to show that some part of the assembly machine is beginning to wear and possibly should be replaced.

SUMMARY OF THE INVENTION

The present invention is implemented in an automatic parts assembler of the type which positions a first part into initial engagement with a second part and then forces the parts together a fixed distance. The preferred method determines the time that the first part initially engages the second part and the time that the parts are forced together. The time difference between the initial engagement and the final assembly is compared against a standard known assembly time and if the comparison is not favorable the assembled parts are rejected.

Apparatus for accomplishing the method incorporates a pusher for pushing the parts into initial engagement and into the final assembly position. A transducer, coupled to the pusher, provides an electrical signal which is a function of the distance travelled by the pusher. A signal processing means, which may incorporate a computer, compares the electrical signal from the transducer against predetermined threshold values, corresponding to distance, to provide an output indicative of the time required to traverse a known distance. Means responsive to the provided output accept or reject the assembled parts as a function of the time required to traverse the known distance.

From the foregoing, it can be seen that it is a primary object of the present invention to provide an improved malfunction detector and a method for use with a parts assembly machine.

It is a further object of the present invention to provide a detecting system and method which can detect progressive wear in assembly machine parts.

It is a further object of the present invention to provide a system and a method which is particularly suited for use in detecting assembly defects in film magazines.

It is yet another object of the present invention to provide a system and a method which identifies each type of error condition separately while also providing process control data to improve maintainability and reduce down time.

These and other objects of the present invention will become more apparent when taken in conjunction with the following description and drawings wherein like characters indicate like parts and which drawings form a part of the present application.

BRIEF DESCRIPTION OF THE DRAWINGS

FIG. 1 illustrates in a cut-away and sectioned view a portion of an automatic parts assembler with a pusher for pushing an end cap onto a film magazine.

FIG. 1A is an exploded view of a segment of FIG. 1

FIG. 2 illustrates in a cut-away and sectioned view a portion of an automatic parts assembler with staking fingers for staking an end cap onto a film magazine.

FIG. 3 illustrates a block schematic diagram form a signal processing system which may be used with the automatic parts assembler of FIGS. 1 and 2.

DESCRIPTION OF THE PREFERRED EMBODIMENT

Figure 4:
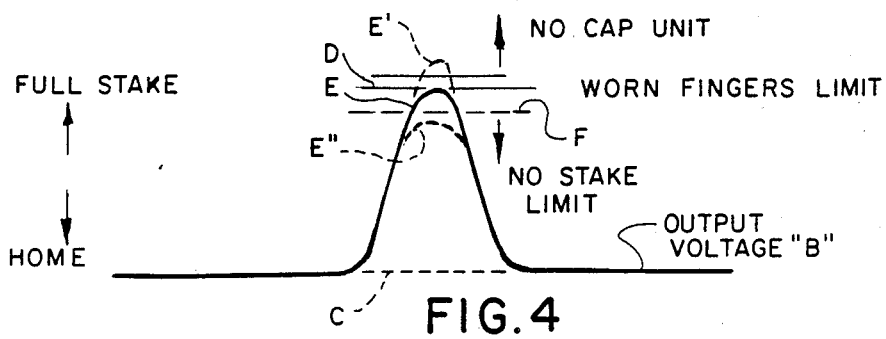
FIG. 4 illustrates a waveform corresponding to the movement of the staking portion of the assembler shown in FIG. 2 using a distance-to-voltage (LVDT) transducer operated by the linear motion of the staking ram.

The present invention has particular utility in assembling two parts with automatic machinery and for purposes of describing a preferred embodiment, there has been selected a system and a method for assembling an end cap to a film magazine.

Referring to FIG. 1 wherein is shown an apparatus for pushing an end cap 12 onto a film magazine 10, the magazine 10 is shown positioned in alignment with the end cap 12. A cap pusher 14 rests against the outer rim 18 of the end cap 12 at a start position A. Coupled to the cap pusher 14 is a linear distance-to-voltage transducer (LVDT) 16. In operation, the cap pusher 14 moves towards the magazine 10 forcing the cap 12 into engagement over the ends of the magazine, which engagement, when correctly done results in the cap pusher 14 resting in the home position designated B. The LVDT 16 provides an output voltage A which is directly proportional to the distance travelled by the cap pusher 14 which distance is the distance between the A and the B position. The output voltage A from LVDT 16 is then directed to an input of a comparator 30, shown in FIG. 3.

Figure 7:
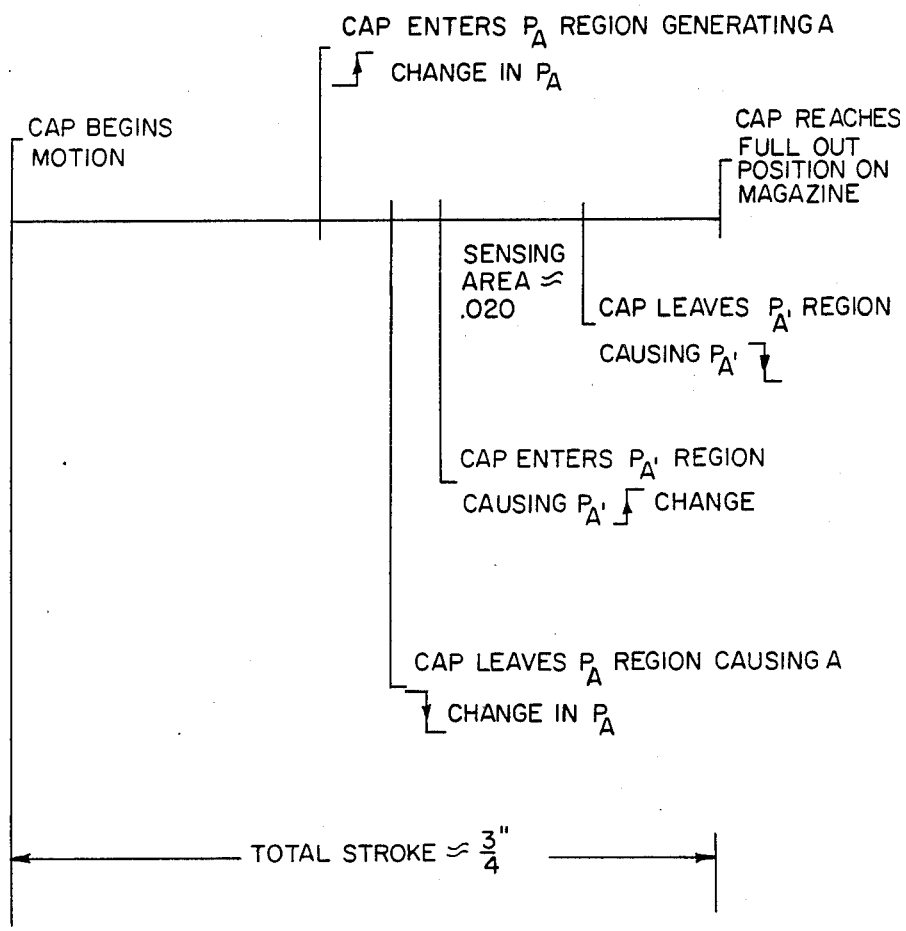
FIG. 7 is a flowchart illustrating the cap to magazine assembly operation.

Referring to FIG. 1A, in conjunction with the flow chart of FIG. 7 between the distances A and B four threshold voltages $V_0$ through $V_3$ are shown. The level of each voltage is selected to provide a threshold against which voltage A is compared. When a threshold set by $V_0$ or $V_1$ is met by output voltage A a transition in pulse $P_A$ occurs. When a threshold set by $V_2$ or $V_3$ is met by output voltage A a transition in pulse $P_{A'}$ occurs. The threshold voltages can be set to provide the best response for the application. For example, the value of $V_0$ could be set to correspond to the voltage A generated when pusher 14 is in position A, or it can be set as shown to correspond to the voltage A when the pusher 14 is slightly past position A, on its way to position B.

Referring now to FIG. 2, the magazine 10, with the end cap 12 in place, moves to a different work station wherein staking fingers 24 are used to stake the outer rim 18 of the end cap 12 onto the magazine body 10. The staking operation can be performed against an anvil 20. Coupled to the staking fingers is a linear distance-to-voltage transducer (LVDT) 22 which provides an output voltage B that is a function of the distance travelled by the staking fingers from the rest position C to the fully staked position D. This output voltage B is directed to an input to the comparator 30 shown in FIG. 3. It will be understood by those persons skilled in the art that a hydraulic ram many be used to drive the staking fingers and that the LVDT 22 could be coupled to the ram's linear moving piston arm to provide an indication of the movement of the staking fingers.

It will also be obvious to those persons skilled in the art that although the system presented thus far is directed to an apparatus for assembling and staking two parts using two types of mechanical assembly motion, that the system may be adapted, in a similar manner, to cover many different types of assembly motions and the assembly of more than two parts.

Referring now to FIG. 3, a comparator circuit 30 receives on its inputs the output voltages A and B along with voltage levels $V_0$ through $V_5$. As previously stated the level of voltages $V_0$ through $V_3$ can be adjusted to correspond to the voltages that are generated by the LVDT 16 when the pusher 14 is moving between position A and position B during a normal assembly operation. In a like manner the voltages $V_4$ and $V_5$ can be set to the value of the output voltage B from the LVDT 22 when the staking fingers are approaching and are in position D,, respectively. For signal a, the comparator 30 outputs pulse signals $P_A$ and $P_{A'}$, having a leading edge transition which takes place at the time that the respective LVDT provides an output voltage indicating that, for example, for the $P_A$ pulse that the pusher 14, in FIG. 1, is at and/or just passing the indicated A position set by $V_o$ and a trailing edge which corresponds to the voltage level from the LVDT 16 when the pusher 14 is at or past the position set by $V_1$. The width of the output pulses $P_A$, from the comparator are thus a function of the time that it takes for the pusher 14 to move from position A to position B. The pulse $P_B$ is formed in a like manner from the output voltage B being compared against the voltage levels $V_4$ and $V_5$.

A microprocessor 32, or other storing and comparing functioning device, has programmed therein acceptable times for normal assembly operation. The pulse width of the incoming pulses $P_A$ and $P_{A'}$ are transformed into an equivalent time, which equivalent time is compared against the time for the normal assembly operations and if the comparison is unfavorable the microprocessor 32 provides an output signal DIVERT A to a diverting mechanism 34 which diverting mechanism is coupled to the flow path of the magazine 10 so as to divert the magazine and the end cap, if any, out of the production line. The microprocessor 32 will upon the computation of an unfavorable time condition for pulse $P_B$ provide an output signal DIVERT B to a diverting mechanism (not shown) similar to the diverting mechanism 34 for removing the magazine assembly from the production flow path.

It will be obvious to persons skilled in the art that the diverting of a defective magazine can be held off until after the assembly operation for placing the end cap and for staking the end cap have beem completed. With that option, only one diverting mechanism is needed with the microprocessor being activated by either the signal being generated by the pusher of FIG. 1 or by the staker of FIG. 2.

Referring now to the waveforms shown in FIG. 4, which waveforms represents the output voltage B from the LVDT 22 of the staker; the continuous curve, indicated generally by E, represents the voltage output from a staker assembly that has performed a correct assembly operation. The dotted waveform E' indicates the voltage output when an end cap is not physically in position to be pushed by the pusher, which in turn permits the pusher to extend a further distance into the magazine area creating an additional voltage output. In a like manner, if the staking fingers are worn that will permit the fingers to move a greater distance than normal before reaching a resistance from the rim 18 of the end cap thereby providing a greater output voltage from the LVDT 22. A limit can thus be established which will trigger an indication device notifying an operator that physically the fingers of the staker have been worn to an unacceptable level. The dotted curve represented as E'', indicates a condition wherein for some reason the staking fingers 24 have not performed the staking function because they have not reached and/or exceeded the threshold line F which defines the distance required to perform a successful staking operation.

The level of the voltage $V_4$ can be set at the level designated F and the voltage $V_5$ can be set at the level designated D.

Figure 5:
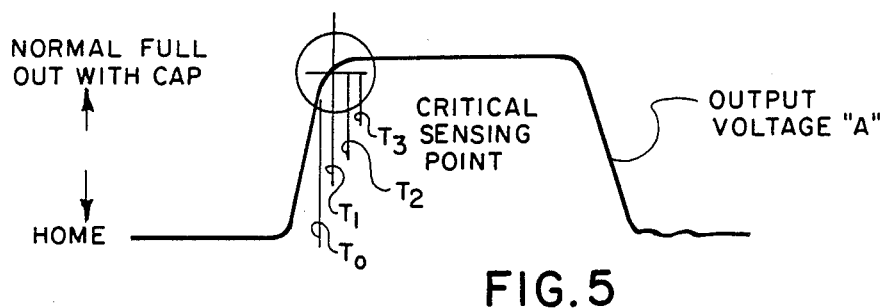
FIG. 5 illustrates a waveform corresponding to the voltage output of a distance-to-voltage (LVDT) transducer coupled to the pusher used in the parts assembler shown in FIG. 1.
Figure 6:
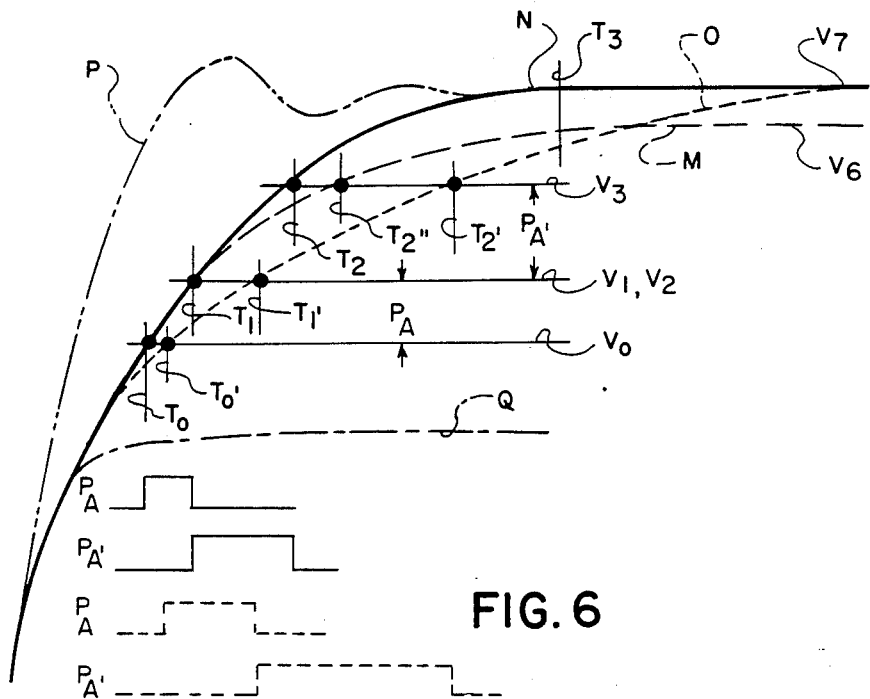
FIG. 6 is an enlarged view of the circled portion of the waveform of FIG. 5, illustrating a group of line graphs corresponding to variations in the output voltage of the distance-to-voltage transducer under different operating conditions during the cap to magazine assembly portion of the present method.

The waveform of FIG. 5 represents the LVDT output voltage A, associated with the pusher assembly in accordance with FIG. 1 performing an acceptable assembly. At the bottom knee of the curve the assembly pushing an end cap is told to move towards the magazine. As movement takes place the output voltage A begins to rise. This operation takes approximately 80 milli-seconds. At time $T_0$ the formal assembly begins to take place. The cap begins to make contact with the magazine and the pushers forward motion may be cushioned by hydraulic means to prevent overshoot. At time $T_3$ final assembly is reached. Between times $T_0$ and $T_3$ the amount of interference is evaluated. This is the area referred to as the critical sensing point. The critical sensing point is enlarged in view in FIG. 6 for clarity. The solid curve N corresponds to a normal cap assembly. The time between $T_0$ and $T_1$, corresponding to the width of the solid line pulse $P_A$, and between $T_1$ and $T_2$, corresponding to the width of the solid line pulse $P_{A'}$, is translated into voltage values $V_0$, $V_1$, and $V_2$, and $V_3$ which values are selected as inputs to the comparator 30. The dashed curve M represents one type of variance from a normal condition. In this particular variance the time period between $T_0$ and $T_1$ is normal but the time between $T_1$ and $T_2''$ associated with the threshold $V_3$ is not normal. A third type of abnormality is shown with the dashed line O. In that particular example, the time period for commencement of $T_0$ is later than normal shown instead occurring at $T_0'$ and the distance between $T_0'$ and $T_1'$ is greater than the normal time difference between $T_0$ and $T_1$ and in a like manner the distance between $T_1'$ and $T_2'$ is greater than that between the normal times of $T_1$ and $T_2$. This is shown with the dashed pulses labeled $P_A$ and $P_A$. A fourth curve P represents the movement of the pusher in a system that incorporates hydraulic cushioning of the pusher which cushioning is generally achieved through an orifice adjustment and which adjustment is shown to be defective. Such movement will cause the $T_0$ and $T_1$ times to be low and will evidence itself in an overshoot condition. Also to be noted is that the curve O and the curve N achieve a voltage level $V_7$ but the curve M only achieves a voltage level $V_6$ in its fully extended position due to a blockage. The curve Q indicates a backwards cap, such that $T_0$, $T_1$ and $T_2=0$.

Figure 8:
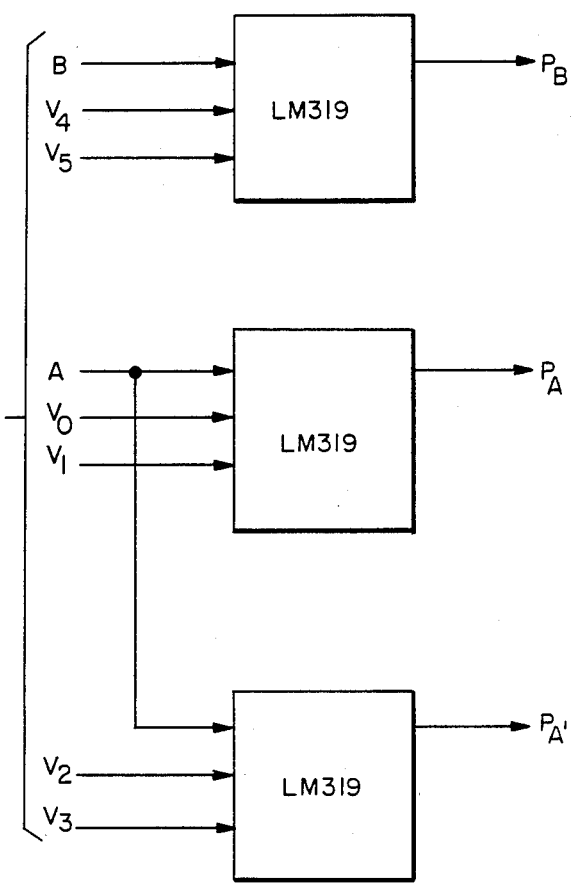
FIG. 8 illustrates, in block diagram form, comparator logic chips which may be used in the comparator of FIG. 3.

Referring to FIG. 8, the comparator 30 may be configured in a number of different ways, the preferred way is to use three comparator chips LM319 from National Semiconductor Inc. connected as shown. If desired the A and B signals can be converted to digital signals by an A/D converter and the comparisons made within the microprocessor.

While there has been shown what is considered to be the preferred embodiment of the present invention, it will be manifest that many changes and modifications may be made therein without departing from the essential spirit of the invention. It is intended therefore, in the annexed claims, to cover all such changes and modifications as may fall within the true scope of the invention.

We claim:

1. A method for detecting assembly errors in an automatic parts assembler of a type which positions a first part into initial engagement with a second part and then forces the parts together a fixed distance comprising the steps of:
   (a) determine a time $T_0$ that said first part initially engages said second part;
   (b) determine a time $T_1$ that it takes the automatic assembler to reach the fixed distance after time $T_0$;
   (c) determine the time difference or ratio between time $T_0$ and time $T_1$;
   (d) compare the time difference or ratio to a time which corresponds to the time that it takes for the correct assembly of said first and said second, part,
   (e) set limits around all time measurements; and
   (f) reject all assemblies which do not have an assembly time corresponding to the correct assembly time.

2. A method for detecting assembly errors in an automatic parts assembler of a type which moves a first part from a start position to a position of initial engagement with a second part and then moves the parts an additional distance into further engagement corresponding to an assembly distance comprising the steps of:
   (a) providing a linear voltage signal which is a function of the assembly distance moved by said parts;
   (b) transforming said provided linear voltage signal into a time signal that is equivalent to the time it takes for said parts to move the assembly distance;
   (c) comparing the time signal of step (b) with a known time signal corresponding to the time for a properly assembled first and second part; and
   (d) indicating a malfunction whenever the comparison of step (c) results in a difference.

3. A method for detecting assembly errors in an automatic parts assembler comprising the steps of:
   (a) determining the velocity of a first part as it engages a second part during an assembly process;
   (b) comparing the determined velocity against a known velocity associated with the satisfactory assembly of a first and a second part; and
   (c) accepting those parts which are assembled with a velocity corresponding to the known velocity.

4. A method for detecting assembly errors in an automatic parts assembler of a type which positions a first part into initial engagement with a second part and then forces the parts together a fixed distance comprising the steps of:
   (a) determining a first time when said first part initially engages said second part;
   (b) determining a second time when the automatic parts assembler reaches a first distance;
   (c) determining a third time when the automatic parts assembler reaches at least a second distance;
   (d) determining the time differences between said first and said second times and said second and said third times to provide a first and a second time difference;
   (e) comprising said first and said second time differences to reference first and second time differences corresponding to the time related to correct assembly of said first and said second part; and
   (f) rejecting all assemblies which do not have first and second time differences that compare within preselected limits.

5. The method according to claim 4 and further comprising the step of additionally rejecting all assemblies wherein the automatic assembler fails to reach either said first or said second fixed distance.

6. In an automatic parts assembler having:

urging means for urging a first part into assembly engagement with a second part the improvement comprising;

signal generating means coupled to said urging means for providing a signal which is a function of the distance traversed by said urging means;

comparator means for receiving the signal from said signal generating means for providing a first timing pulse when said urging means reaches a first position and for providing a second timing pulse when said urging means reaches a second position; and processor means for comparing the times represented by said first and said second timing pulse against a time difference ratio corresponding to a standard successful assembly and for providing an acceptance signal when the times are substantially equal.

7. In an automatic parts assembler having a:

linear means for pushing a first part into assembly engagement with a second part the improvement comprising;

means for providing a signal which is a function of the distance traversed by said linear means; and means responsive to said provided signal for providing a pulse signal having a pulse width representing the time between said linear means reaching a first position and a second position; and means responsive to the represented time of said provided pulse signal for accepting the assembled first and second part when the represented time corresponds to the time of a previously correctly assembled first and second part.

* * * * *